United States Patent
Li

(10) Patent No.: US 9,904,783 B2
(45) Date of Patent: Feb. 27, 2018

(54) INFORMATION PROCESSING METHOD AND ELECTRONIC DEVICE

(71) Applicant: Lenovo (Beijing) Co., Ltd., Beijing (CN)

(72) Inventor: Yakun Li, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 54 days.

(21) Appl. No.: 14/753,355

(22) Filed: Jun. 29, 2015

(65) Prior Publication Data

US 2016/0232355 A1    Aug. 11, 2016

(30) Foreign Application Priority Data

Feb. 9, 2015   (CN) .......................... 2015 1 0066874
Feb. 9, 2015   (CN) .......................... 2015 1 0067634

(51) Int. Cl.
*G06F 21/56*   (2013.01)
*G06F 21/62*   (2013.01)

(52) U.S. Cl.
CPC ........ *G06F 21/566* (2013.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 7,397,464 B1 * | 7/2008 | Robbins | ................ | G06F 3/0425 345/156 |
| 8,312,539 B1 * | 11/2012 | Nachenberg | .......... | G06F 21/566 713/188 |
| 9,183,383 B1 * | 11/2015 | Yablokov | ................ | G06F 21/51 |

(Continued)

FOREIGN PATENT DOCUMENTS

| | | |
|---|---|---|
| CN | 102646173 A | 8/2012 |
| CN | 103207811 A | 7/2013 |

(Continued)

OTHER PUBLICATIONS

Beauchemin (Amy Beauchemin, published on Microsoft Excel 2010 Tutorial, http://www.goodwin.edu/pdfs/resources/excel-2010-tutorial.pdf, source: office. Microsoft.com, 1/11).*

(Continued)

*Primary Examiner* — Peter Poltorak
(74) *Attorney, Agent, or Firm* — Harness, Dickey & Pierce, P.L.C.

(57) ABSTRACT

An information processing method and an electronic device are provided. The method includes: detecting a first operation of a first application, where the first operation is for displaying a first interface corresponding to the first application on a display of the electronic device; determining whether the first application is identical to one of M applications to obtain a first determination result where M is a positive integer, where each of the M applications has at least one corresponding interface currently displayed on the (Continued)

display of the electronic device; and generating and outputting a prompt message if the first determination result indicates that the first application is not identical to any one of the M applications.

18 Claims, 10 Drawing Sheets

(56) References Cited

U.S. PATENT DOCUMENTS

| | | | | |
|---|---|---|---|---|
| 2002/0051056 | A1* | 5/2002 | Holtslag | G09G 5/003 348/135 |
| 2002/0122065 | A1* | 9/2002 | Segal | G06F 9/4443 715/783 |
| 2003/0101381 | A1* | 5/2003 | Mateev | G06F 21/53 714/38.14 |
| 2003/0169298 | A1* | 9/2003 | Ording | G06F 3/0481 715/810 |
| 2004/0004638 | A1* | 1/2004 | Babaria | G06F 3/0481 715/805 |
| 2004/0025015 | A1* | 2/2004 | Satterlee | G06F 21/51 713/164 |
| 2004/0181776 | A1* | 9/2004 | Atkin | G06F 3/018 717/111 |
| 2005/0125685 | A1* | 6/2005 | Samuelsson | H04L 63/0218 726/26 |
| 2005/0268290 | A1* | 12/2005 | Cognigni | G06F 21/128 717/139 |
| 2006/0041941 | A1 | 2/2006 | Suzuki et al. | |
| 2006/0085853 | A1* | 4/2006 | Simpson | G06F 21/10 726/22 |
| 2007/0136579 | A1* | 6/2007 | Levy | H04L 63/102 713/168 |
| 2009/0165109 | A1* | 6/2009 | Hird | G06F 21/33 726/7 |
| 2009/0327979 | A1* | 12/2009 | Haverinen | 715/864 |
| 2010/0291964 | A1* | 11/2010 | Nishide | H04W 76/025 455/550.1 |
| 2011/0028138 | A1* | 2/2011 | Davies-Moore | G06F 3/04817 455/418 |
| 2011/0037711 | A1* | 2/2011 | Siddiqui | G06F 3/1423 345/173 |
| 2011/0119756 | A1* | 5/2011 | McClusky | G06F 21/6245 726/17 |
| 2012/0124651 | A1* | 5/2012 | Ganesan | G06F 21/31 726/4 |
| 2013/0055387 | A1* | 2/2013 | Kim | G06F 21/55 726/22 |
| 2014/0025949 | A1* | 1/2014 | Kay | H04L 63/0428 713/168 |
| 2014/0068776 | A1 | 3/2014 | Xiao et al. | |
| 2014/0282884 | A1* | 9/2014 | Bao | G06F 21/31 726/4 |
| 2015/0269580 | A1* | 9/2015 | Subramanian | G06Q 20/4016 705/44 |
| 2015/0319161 | A1* | 11/2015 | Dimmick | H04L 63/0823 726/4 |
| 2017/0242532 | A1* | 8/2017 | Zheng | G06F 3/0346 |

FOREIGN PATENT DOCUMENTS

| | | |
|---|---|---|
| CN | 103679017 A | 3/2014 |
| CN | 103714291 A | 4/2014 |
| CN | 103777975 A | 5/2014 |
| CN | 103984468 A | 8/2014 |
| CN | 104123498 A | 10/2014 |

OTHER PUBLICATIONS

Second Chinese Office Action regarding Application No. 201510067634.3 dated Aug. 28, 2017. Translation summary provided by Unitalen Attorneys at Law.
First Chinese Office Action regarding Application No. 201510067634.3 dated Mar. 17, 2017. English translation provided by Unitalen Attorneys at Law.
First Chinese Office Action regarding Application No. 201510066874.1 dated Mar. 20, 2017. English translation provided by http://globaldossier.uspto.gov.

* cited by examiner

INFORMATION PROCESSING METHOD AND ELECTRONIC DEVICE

The present application claims the priority to Chinese Patent disclosure No. 201510066874.1, entitled as "INFORMATION PROCESSING METHOD AND ELECTRONIC DEVICE", filed on Feb. 9, 2015 with State Intellectual Property Office of People's Republic of China, which is incorporated herein by reference in its entirety.

The present application claims the priority to Chinese Patent disclosure No. 201510067634.3, entitled as "INFORMATION PROCESSING METHOD AND ELECTRONIC DEVICE", filed on Feb. 9, 2015 with State Intellectual Property Office of People's Republic of China, which is incorporated herein by reference in its entirety.

FIELD

The application relates to the field of electronic technology, and particularly to an information processing method and an electronic device.

BACKGROUND

With the development of the electronic technology, in order to responds to various applications rapidly, a process run in background of an electronic device, such as a mobile phone or a panel computer, normally is capable of obtaining an application name of an application that is displayed currently at the top-most layer and popping out a window to the top-most layer. That is, once any one of the applications is triggered by a user, the electronic device is capable of displaying an corresponding application window to the top-most layer in response to the application rapidly, thus facilitating following operations of the user.

In accordance with one technology, when malware in an electronic device detects that a valid application is about to pop out a corresponding interface, the malware can actively pop out a similar interface to cover the interface corresponding to the valid application. For example, when a mobile-phone user performs a payment with the application of Alipay, a fishing application for stealing a user's money pops out a corresponding interface to cover the interface corresponding to Alipay.

In another technology, in the case that a valid interface of a current application is covered by a false interface similar to the valid interface, a user might readily take the false interface as the valid interface that is opened intentionally. An operation risk inevitable exists if the user operates on the false interface. Therefore, there exists a technical problem that the information security in an electronic device can not be ensured.

Further, due to the technical problem of information security in an electronic device, personal information of the user highly tends to be leaked. Therefore, there exists a technical problem of user's personal information leak in an electronic device.

Further, because a false interface directly covers a valid interface to be displayed when a change occurs in a valid application in a short time, a user cannot identify the switching from the valid interface to the false interface. Therefore, there exists a technical problem that a user cannot be notified of a switching of application in time when the switching is about to happen.

SUMMARY

According to embodiments of the present disclosure, there is provided an information processing method and an electronic device for solving the technical problem that information security in an electronic device of the conventional technology can not be ensured to achieve a technical effect of ensuring the information security.

In one aspect, according to an embodiment of the present disclosure, there is provided an information processing method, which includes:

detecting a first operation of a first application, wherein the first operation is for displaying a first interface corresponding to the first application on a display of the electronic device;

determining whether the first application is identical to one of M applications to obtain a first determination result where M is a positive integer, wherein each of the M applications has at least one corresponding interface currently displayed on the display of the electronic device; and generating and outputting a prompt message if the first determination result indicates that the first application is not identical to any one of the M applications.

In another aspect, according to an embodiment of the present disclosure, there is provided an electronic device including a processor and a storage medium with operation instructions, where when the operation instructions are run, following steps are carried out by the processor:

detecting a first operation of a first application, wherein the first operation is for displaying a first interface corresponding to the first application on a display of the electronic device;

determining whether the first application is identical to one of M applications to obtain a first determination result where M is a positive integer, wherein each of the M applications has at least one corresponding interface currently displayed on the display of the electronic device; and generating and outputting a prompt message if the first determination result indicates that the first application is not identical to any one of the M applications.

With the technical solutions in the disclosure, when a first application run in the background requests to pop out an interface, it is determined whether the first application is identical to one of M applications, and a prompt message is generated and output if the first application is not identical to any one of the M applications. Thus, a user can be notified of a switching from the current application timely and effectively, achieving the technical effect of ensuring the information security when an application is switched.

With the technical solutions in the disclosure, a user can be notified of a switching from the current application timely and effectively when the switching is about to happen. While in the conventional technology, there is not any prompt message to notify a user of a switching in time when malware in an electronic device actively pops out a similar interface to cover an valid interface of an valid application, such that the user would take the similar interface as the valid interface opened by himself and thus his personal information is leaked by operating on the similar interface without knowing the truth. Therefore, the technical solutions in the disclosure have a technical effect of protecting user's personal information when an application is switched.

With the technical solutions in the disclosure, a user can be notified of a switching from the current application in time when the switching is about to happen. While in the conventional technology, a user cannot directly identify a false interface during the short time of the switching from a valid interface to the false interface. The technical solutions in the disclosure have a technical effect of notifying a user of a switching of an application timely when the switching is about to happen.

According to technical solutions of the embodiments of the disclosure, the following technical means is employed: at least one application interface displayed on a current display of the electronic device is determined; an application corresponding to the application interface is determined; at least one application parameter corresponding to the application is acquired; a first notice corresponding to the application is generated and output based on the at least one application parameter. Therefore, the electronic device can display the information about an application corresponding to a currently used interface by the user. In the case where a malicious interface appears, the user is able to timely tell the truth from the false based on the notice displayed on the current interface, guaranteeing the information security. Therefore, the technical problem of being unable to guarantee the information security in the electronic device of conventional technologies is effectively solved, and the technical effect of the user being prompted in time to guarantee the information security is achieved.

According to the technical solutions of the embodiments of the disclosure, the following technical means is employed: a first display duration of the first notice is acquired; and the first notice is controlled to be in a non-display state in the case where the first display duration is equal to or greater than a preset threshold. Accordingly, after the notice is displayed for a certain duration, the notice automatically disappears and the usage by the user is not affected, the technical effect of guaranteeing the information security of the user without affecting the usage by the user is achieved.

According to the technical solutions of the embodiments of the disclosure, the following technical means is employed: at least one application interface displayed on a current interface of the display of the electronic device is determined; an application corresponding to the application interface is determined; at least one application parameter corresponding to the application is acquired; and a first notice corresponding to the application is generated and output based on the at least one application parameter. Thus, the user can learn in real time whether the application corresponding to the current interface is safe during the usage by the user, the privacy leak due to the usage of an unsafe application is avoided. Therefore, the technical problem of user experience being low in an electronic device of the conventional technologies is effectively solved, guaranteeing the safe usage by the user and improving the user experience.

BRIEF DESCRIPTION OF THE DRAWINGS

The accompanying drawings needed to be used in the description of the embodiments or the conventional technology will be described briefly as follows, so that the technical solutions according to the embodiments of the present disclosure or according to the conventional technology will become clearer. Apparently, the accompanying drawings in the following description are only some embodiments of the present disclosure.

DETAILED DESCRIPTION

According to embodiments of the present disclosure, there is provided an information processing method and an electronic device for solving the technical problem that information security in an electronic device of the conventional technology can not be ensured to achieve a technical effect of ensuring the information security.

An information processing method, applicable to an electronic device, includes:

detecting a first operation of a first application, where the first operation is for displaying a first interface corresponding to the first application on a display of the electronic device;

determining whether the first application is identical to one of M applications to obtain a first determination result where M is a positive integer, where each of the M applications has at least one corresponding interface currently displayed on the display of the electronic device; and generating and outputting a prompt message if the first determination result indicates that the first application is not identical to any one of the M applications.

With the above technical solution, when a first application run in the background requests to pop out an interface, it is determined whether the first application is identical to one of M applications, and a prompt message is generated and output if the first application is not identical to any one of the M applications. Thus, a user can be notified of a switching from the current application in time when the switching is about to happen, achieving the technical effect of ensuring the information security when an application is switched.

For better understanding the above technical solution, a detail description thereof is made in conjunction with the accompanying drawings and the embodiments. It should be understood that the embodiments and detailed technical features in the embodiments are only for illustrating rather than limiting the technical solution of the present application, and may be combined if there is no conflict.

In the embodiments of the present disclosure, the electronic device may be a desk computer, a notebook computer, a mobile phone or a panel computer, but is no limited thereto.

Figure 1:
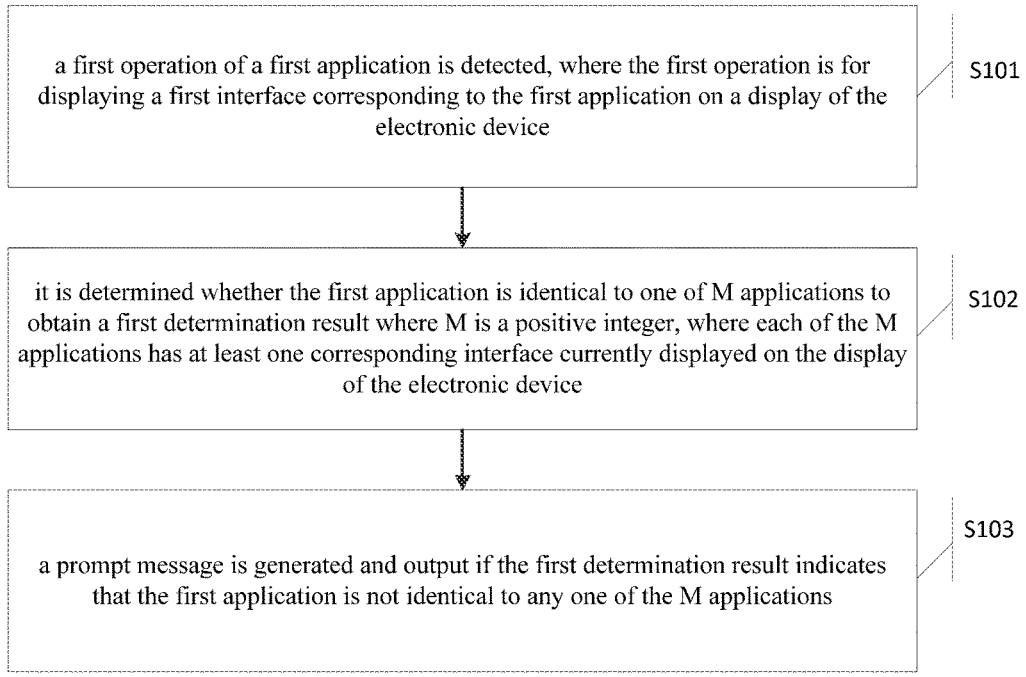
FIG. 1 is a flowchart of an information processing method according to an embodiment of the present disclosure.

Referring to FIG. 1, according to an embodiment of the present disclosure, there is provided an information processing method applicable to an electronic device, including steps S101 to S103 as follows.

In step S101, a first operation of a first application is detected, where the first operation is for displaying a first interface corresponding to the first application on a display of the electronic device.

In step S102, it is determined whether the first application is identical to one of M applications to obtain a first determination result where M is a positive integer, where each of the M applications has at least one corresponding interface currently displayed on the display of the electronic device.

In step S103, a prompt message is generated and output if the first determination result indicates that the first application is not identical to any one of the M applications.

In the embodiment, step S101 to step S103 may be implemented as follows.

Specifically, the technical solution in the embodiment is described with reference to a mobile phone in an Android system as an example. A process run in background of the mobile phone in the Android system is capable of obtaining an application name of an application that is displayed currently at the top-most layer of the system and actively popping out a window to the top-most layer. A first application tries to call a function "addView" of process "WindowManager" to pop out a corresponding window such that a first interface corresponding to the window can be displayed on a display of the mobile phone to interact with a user through the first interface, while another interface corresponding to a second application is currently displayed at the top-most layer of the display of the mobile phone. In this case, it needs to determine whether the first application is identical to the second application before the interface that is currently displayed at the top-most layer is covered by the first interface of the first application. It can be determined whether a switching of application is about to happen based on the determination result. Thus, if a switching of application is about to happen, a prompt message may be generated and output to notify a user of the switching about to happen, an unnecessary loss may be avoided. For example, in a payment with the application "Alipay for mobile phone" by a user of a mobile phone, when the user click a button "Yuebao" on a payment interface of the application "Alipay for mobile phone" to pay, normally an interface of Alipay displayed currently on a display will be switched to an interface of Yuebao, which both are interfaces of the same application. However, if there exists an invalid application in the mobile phone, the invalid application will cover the interface of Yuebao with a popped out invalid interface. After that, it is difficult for the user to determine whether the currently displayed interface is an invalid interface if the content of the invalid interface is similar to that of the interface of Yuebao. With the technical solution of the present disclosure, when an invalid application tries to pop out a false interface, it is determined whether the invalid application is identical to the application active at the foreground of the system. A prompt message is generated to notify the user of a switching from the current application about to happen if the determination result indicates that the two applications are not identical, an unnecessary loss resulted from the invalid application is avoided timely and effectively.

Apparently, the technical solution of the embodiment is also adaptive to a work mode of multi-window display. In the case that the electronic device is in the work mode of multi-window display, there are M applications run at the foreground where M is a positive integer, including, for example, the applications of QQ, Kingsoft Powerword, Taobao and the like, and each of the M applications has at least one corresponding interface displayed on the display of the electronic device. In this case, it is determined whether the first application is identical to one of the M applications. If the first application is not identical to any one of the M applications, a prompt message is generated and output to indicate that one of currently running applications is about to be switched.

In practice, step S102 has at least the following two manners of determination, but is not limited thereto.

First Manner of Determination

Figure 2:
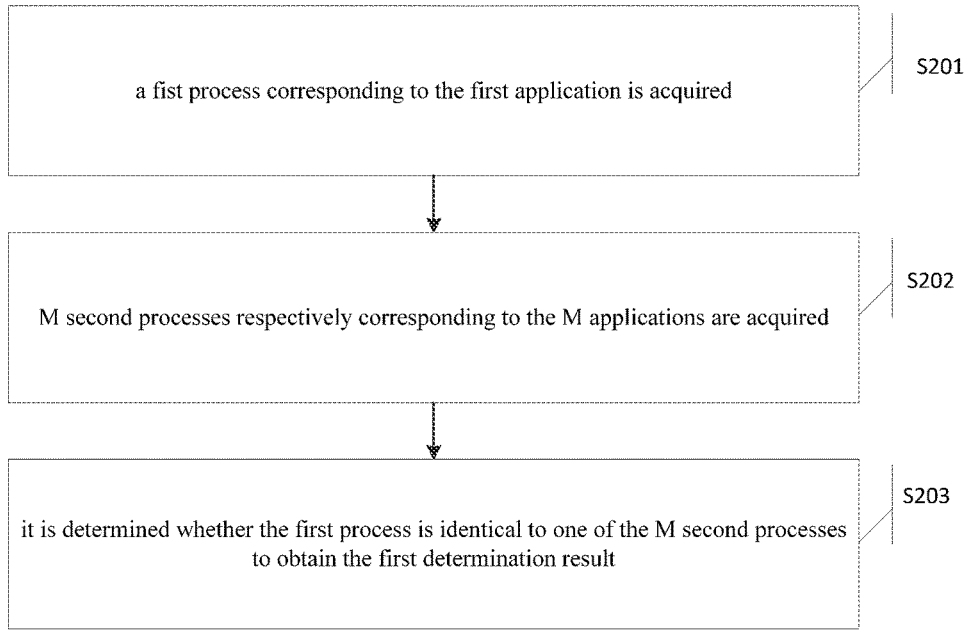
FIG. 2 is a flowchart of a first manner of determination in Step S102 of the information processing method according to an embodiment of the present disclosure.

A first manner of determination is to compare processes corresponding to the applications. Referring to FIG. 2, step S102 may include steps S201 to S203 as follows.

In step S201, a first process corresponding to the first application is acquired.

In step S202, M second processes respectively corresponding to the M applications are acquired.

In step S203, it is determined whether the first process is identical to one of the M second processes to obtain the first determination result.

In the embodiment, it may be detected process information of the M processes corresponding to the M applications displayed currently on the display of the electronic device and process information of the first process respectively, and then it may be determined whether the first process is identical to one of the M processes to obtain the first determination result. Still taking the above example in which an invalid application tries to cover a valid payment interface with a false interface when a payment is about to be performed through the interface of Yuebao after interacting with the interface of Alipay, because a process corresponding to the invalid application is not identical to any one of processes corresponding to the applications having an interface displayed on the display, it may be determined rapidly that the first application is an invalid application.

Figure 3:
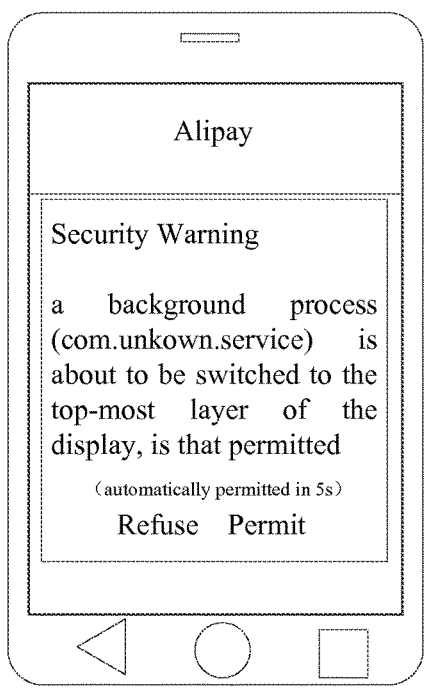
FIG. 3 is a first schematic diagram of the first manner of determination in Step S102 of the information processing method according to an embodiment of the present disclosure.

In practice, taking the electronic device is a smart phone as an example. In the case that a user uses multiple applications in the smart phone at the same time, a display of the electronic device of the smart phone displays multiple interfaces corresponding to the multiple applications. For example, in the case that the user activates three applications including the applications of QQ, the Alipay and W'echat, a background process of the smart phone pops out interfaces respectively corresponding to the three applications, such as a login interface of the application of QQ, an application interface of the application of Alipay and an interface "moments" of the application of Wechat. Regardless of whether the three interfaces are displayed in a way that only one of the three interfaces is fully extended to the entire display or in a way that all of the three interface are displayed on the display by means of small windows popped out, that is, multiple interfaces are displayed on the display at the same time. The three interfaces are referred to as interfaces currently displayed on the display of the electronic device as long as the three interfaces can be individually displayed on the display without being covered. Apparently, in practice, how to determine a currently displayed interface depends on different types of the electronic device, which is not limited herein. Here, the interfaces are displayed by means of small windows in the smart phone, for example. In this case, the M applications in the embodiment may be the applications of QQ, Alipay and Wechat. When the user performs an operation through an interface of Alipay to pay by Yuebao, a first application tries to pop out a first interface. In this case, the determination is performed by the first manner of determination to compare a process corresponding to the first application with processes corresponding to the three applications. If the process corresponding to the first application is not identical to any one of the processes corresponding to the three applications, a prompt message is generated to notify the user that a first interface corresponding to the first application is about to be displayed on the display of the electronic device. For another example, if the interfaces are displayed in the way that only one of the three interfaces is fully extended to the entire display, and the user performs an operation through an interface of Alipay to pay by Yuebao, the prompt message is displayed by means of a notification window in the interface corresponding to Alipay, referring to FIG. 3.

Second Manner of Determination

It is also possible to obtain application information corresponding to applications. For example, it is possible to detect and obtain application information corresponding to the M applications and the first application, such as an application name, an installation path, a version of the applications. Then the application information corresponding to the first application is compared with that corresponding to the M applications. The obtained application information corresponding to the applications may be displayed directly in a certain area of corresponding interfaces such that the user may compare the application information to determine the validation of the interfaces, or may be compared and determined to display a resultant determination result on the interfaces corresponding to the individual applications.

Figure 4:
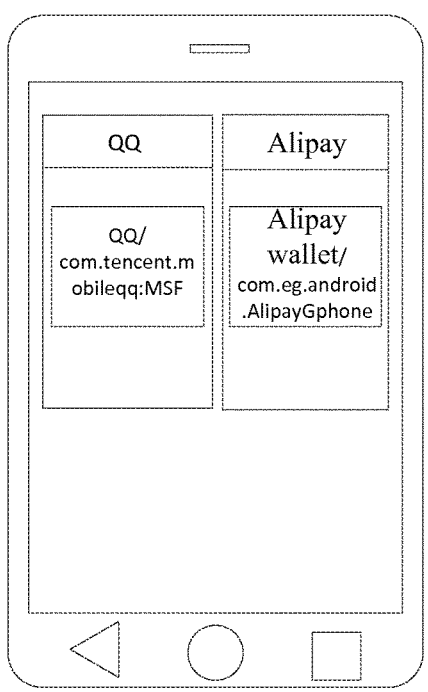
FIG. 4 is a first schematic diagram of a second manner of determination in Step S102 of the information processing method according to an embodiment of the present disclosure.

Here, the implementation of the second manners of determination of the embodiment is described in detail with an example in which the interfaces are displayed by means of small windows in the smart phone. In this case, it is determined that the login interface of QQ and the application interface of Alipay are interfaces corresponding respectively to these two applications that are currently displayed on the display. After the smart phone obtains the application name of the application of QQ as "QQ" and a package name thereof as "com.Tencent.Mobileqq:MSF", and the application name of the application of Alipay as "Alipay Wallet" and a package name thereof as "com.eg.android.AlipayGphone", the smart phone generates a first notification message for the application of QQ as "QQ/com.Tencent.Mobileqq:MSF" and display the first notification message for the application of QQ in an area corresponding to the login interface of QQ by mean of a notification window; and also generates a first notification message for the application of Alipay as "Alipay Wallet/com.Tencent.Mobileqq:MSF" and display the first notification message for the application of Alipay in an area corresponding to the application interface of Alipay by mean of a notification window, referring to FIG. 4. The user determines whether the first application is a valid application based on the prompt content in the notification windows. Apparently, the prompt message may be inserted into a title bar of the corresponding application. Alternatively, the prompt messages of applications may be combined together to be displayed in a fixed area on the bottom of the display of the smart phone, which certainly may be designed or changed by those skilled in the art and will not be limited herein.

In the embodiment, the following step may be performed after step S102:

displaying the first interface corresponding to the first application on the display of the electronic device in response to the first operation if the first determination result indicates that the first application is identical to one of the M applications.

In practice, if the first determination result indicates that the first application is identical to one of the M applications, it is indicated that the first application is a valid application that is permitted by the user, which means the user permits the first operation of the first application to pop out the first interface. Thus, the first interface corresponding to the first application is displayed on the display of the electronic device.

Figure 5:
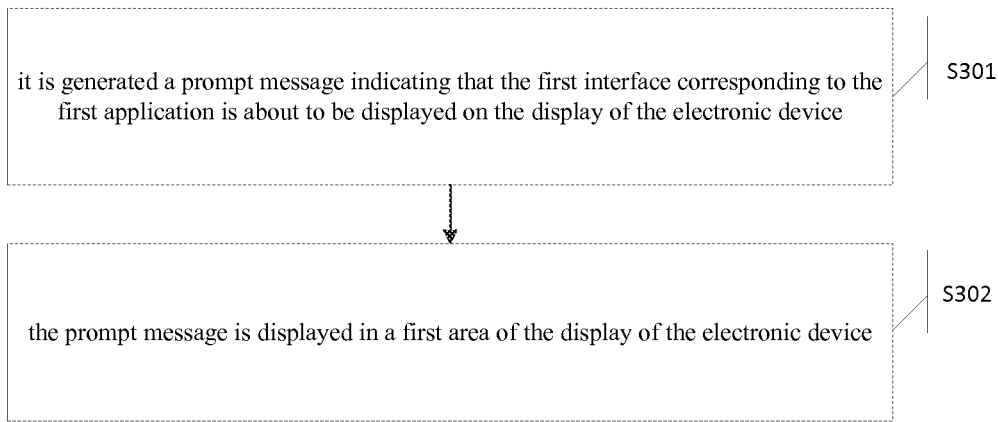
FIG. 5 is a flowchart of Step S103 of an embodiment of the present disclosure.

Referring to FIG. 5, step S103 of the embodiment may include step S301 and step S302 as follows.

In step S301, it is generated a prompt message indicating that the first interface corresponding to the first application is about to be displayed on the display of the electronic device.

In step S302, the prompt message is displayed in a first area of the display of the electronic device.

In practice, the prompt message that is generated in step S301 and indicates that the first interface corresponding to the first application is about to be displayed on the display of the electronic device may be a prompt message as "a background process is about to be switched to the top-most layer of the display", or a prompt message to notify the user that the first application is not identical to any one of the M applications. And the generated prompt message is displayed in the first area in the at least one interface corresponding to one of the M applications by which the first application is triggered.

Figure 6:
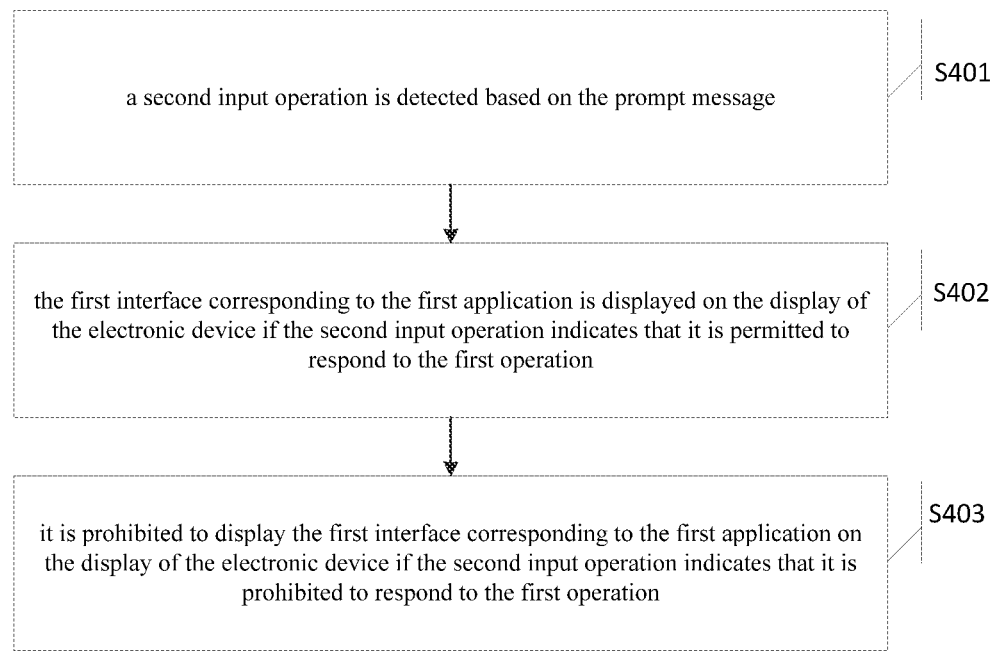
FIG. 6 is a flowchart of a first process included in the method of an embodiment after Step 302.

Referring to FIG. 6, the embodiment may further include step S401 to step S403 as follows after step S302 of displaying the prompt message in the first area of the display of the electronic device.

In step S401, a second input operation is detected based on the prompt message.

In step S402, the first interface corresponding to the first application is displayed on the display of the electronic device if the second input operation indicates that it is permitted to respond to the first operation.

In step S403, it is prohibited to display the first interface corresponding to the first application on the display of the electronic device if the second input operation indicates that it is prohibited to respond to the first operation.

In practice, the prompt message is displayed on the display of the electronic device to prompt the user whether to display the first interface corresponding to the first application on the display of the electronic device. For example, the window of the prompt message may further include two operation options of "permit" and "refuse", or may be in another form of alarm or prompt for user, which will not be limited herein. If the second input operation is detected as that the user chooses the operation option of "permit" based on the prompt message, it is indicated that the user permits the first application to respond to the first operation and thus the first interface corresponding to the first application is displayed on the display of the electronic device. If the second input operation is detected as that the user chooses the operation option of "refuse" based on the prompt message, it is prohibited to display the first interface corresponding to the first application is displayed on the display of the electronic device.

Figure 7:
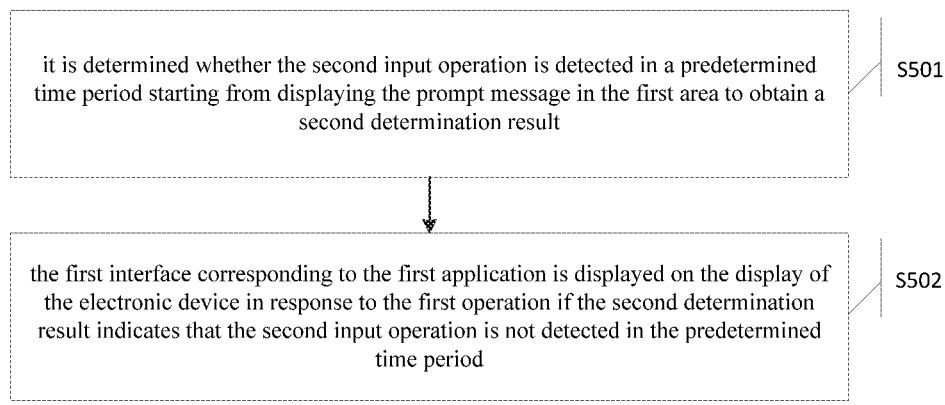
FIG. 7 is a flowchart of a second process included in the method of an embodiment after Step 302.

Referring to FIG. 7, the embodiment may further include step S501 and step S502 after step S302 of displaying the prompt message in the first area of the display of the electronic device.

In step S501, it is determined whether the second input operation is detected in a predetermined time period starting from displaying the prompt message in the first area to obtain a second determination result.

In step S502, the first interface corresponding to the first application is displayed on the display of the electronic device in response to the first operation if the second determination result indicates that the second input operation is not detected in the predetermined time period.

In practice, after the obtained prompt message is displayed in a first area of the display of the electronic device, the first application may be set to be permitted automatically to respond to the first operation if the second input operation is not detected in the predetermined time period starting from displaying the prompt message in the first area, such that the first interface corresponding to the first application is displayed on the display of the electronic device. The predetermined time period can be set by those skilled in the art as required, for example, 5 seconds or 10 seconds. Alternatively, the first application may be set to be prohibited automatically to respond to the first operation if the second input operation is not detected in the predetermined time period starting from displaying the prompt message in the first area, such that the first interface corresponding to the first application is refused to be displayed on the display of the electronic device. Apparently, it may be set by those skilled in the art as required whether to permit or prohibit automatically the first application to respond to the first operation after the predetermined time period.

Figure 8:
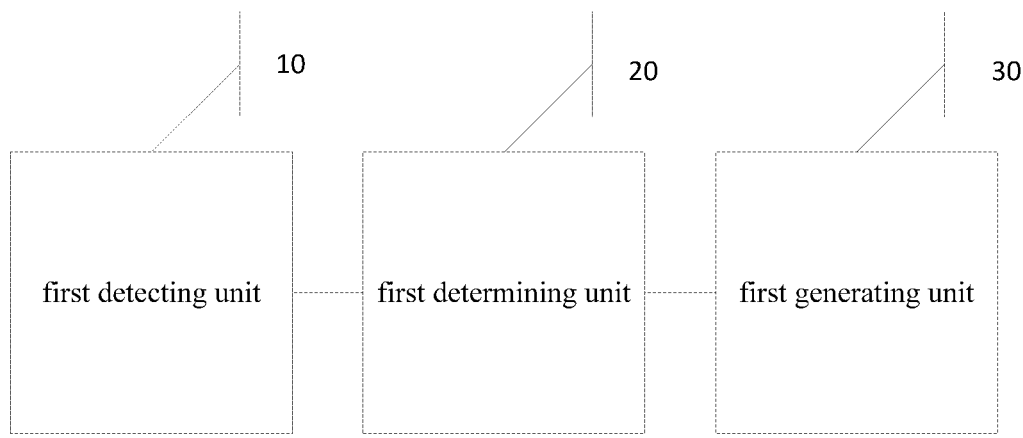
FIG. 8 is a structural block diagram of an electronic device according to an embodiment of the present disclosure.

Based on the same inventive concept as that of the information processing method in FIG. 1, an electronic device as shown in FIG. 8 is provided according to another embodiment, including:

a first detecting unit 10, configured to detect a first operation of a first application, where the first operation is for displaying a first interface corresponding to the first application on a display of the electronic device;

a first determining unit 20, configured to determine whether the first application is identical to one of M applications to obtain a first determination result where M is a positive integer, where each of the M applications has at least one corresponding interface currently displayed on the display of the electronic device; and a first generating unit 30, configured to generate and output a prompt message if the first determination result indicates that the first application is not identical to any one of the M applications.

In the embodiment, for the purpose of determining whether the first application is identical to one of the M applications, the first determining unit 10 may include:

a first acquiring module, configured to acquire a first process corresponding to the first application;

a second acquiring module, configured to acquire M second processes respectively corresponding to the M applications; and a first determining module, configured to determine whether the first process is identical to one of the M second processes to obtain the first determination result.

In the embodiment, for the purpose of displaying in time and effectively the first interface corresponding to the first application on the display of the electronic device if the first application is identical to one of the M applications, the electronic device may further include:

a first processing unit, configured to display the first interface corresponding to the first application on the display of the electronic device in response to the first operation if the first determination result indicates that the first application is identical to one of the M applications.

In the embodiment, the first generating unit 30 may include:

a first generating module, configured to generate a prompt message indicating that the first interface corresponding to the first application is about to be displayed on the display of the electronic device; and a first display module, configured to display the prompt message in a first area of the display of the electronic device.

In the embodiment, for the purpose of selecting an interface about to display on the top-most layer of the display of the electronic device as desired by the user after the user is given the prompt message, the electronic device may further include:

a first detecting module, configured to detect a second input operation based on the prompt message;

a second display module, configured to display the first interface corresponding to the first application on the display of the electronic device if the second input operation indicates that it is permitted to respond to the first operation; and a first prohibiting module, configure to prohibit displaying the first interface corresponding to the first application on the display of the electronic device if the second input operation indicates that it is prohibited to respond to the first operation.

In the embodiment, for the purpose of controlling the display of the electronic device even if the user does not perform any input operations, the electronic device may further include:

a second determining unit, configured to determine whether the second input operation is detected in a predetermined time period starting from displaying the prompt message in the first area to obtain a second determination result; and a second processing unit, configured to display the first interface corresponding to the first application on the display of the electronic device in response to the first operation if the second determination result indicates that the second input operation is not detected in the predetermined time period.

With the technical solutions in the disclosure, when a first application run in the background requests to pop out an interface, before the interface is popped out, it is determined whether the first application is identical to one of M applications, and a prompt message is generated and output if the first application is not identical to any one of the M applications. Thus, a user may be notified of a switching from the current application, achieving the technical effect of ensuring the information security when an application is switched.

With the technical solutions in the disclosure, a user can be notified of a switching from the current application in time when the switching is about to happen. While in the conventional technology, there is not any prompt message to notify a user of a switching in time when malware in an electronic device actively pops out a similar interface to cover an valid interface of an valid application, such that the user would take the similar interface as the valid interface opened by himself and thus his personal information is leaked by operating on the similar interface without. Therefore, the technical solutions in the disclosure have a technical effect of protecting user's personal information when an application is switched.

With the technical solutions in the disclosure, a user can be notified of a switching from the current application in time when the switching is about to happen. While in the conventional technology, a user cannot directly identify a false interface during the short time of the switching from a valid interface to the false interface. The technical solutions in the disclosure have a technical effect of notifying a user of a switching of an application timely when the switching is about to happen.

It should be understood by those skilled in the art that the embodiments of the disclosure may be provided as method, system or computer program product. Therefore, the embodiments of the disclosure may be complete hardware-based, complete software-based or software-hardware combined. Furthermore, the embodiments of the disclosure may be in the form of computer program product implemented on one or more computer-available storage medium (including but not limited to disc storage, CD-ROM, optical storage) having computer available program codes.

The disclosure is described in conjunction with flowcharts and/or block diagrams of the method, device (system) and computer program product according to the embodiments of the disclosure. It is to be understood that each or any combination of flows and/or blocks in the flowcharts and/or block diagrams may be implemented with computer program instructions. The computer program instructions may be supplied to a processor of general-purpose computer, dedicated computer, embedded processor or other programmable data processing devices to generate a machine, so that apparatus(es) for implementing function(s) specified in one or more flows in the flowcharts and/or one or more blocks in the block diagrams may be generated with the instructions executed by the processor of computer or other programmable data processing devices.

The computer program instructions may also be stored in a computer readable storage which can instruct the computer or other programmable data processing devices to function in specific ways so that a product including an instruction apparatus is generated with the instructions stored in the computer readable storage. The function(s) specified in one or more flows in the flowcharts and/or one or more blocks in the block diagrams is implemented with the instruction apparatus.

The computer program instructions may also loaded to the computer or other programmable data processing devices, so that a series of operation steps are performed on the computer or other programmable devices to generate computer-implemented processes. Step(s) for implementing the function(s) specified in one or more flows in the flowcharts and/or one or more blocks in the block diagrams is provided with the instructions executed on the computer or other programmable devices.

Specifically, the computer program instructions corresponding to the information processing method in the embodiment of the disclosure may be stored in store mediums such as optic disk, hard disk or U disk. The computer program instructions corresponding to the information processing method and stored in the storage medium, when executed, include:

detecting a first operation of a first application, where the first operation is for displaying a first interface corresponding to the first application on a display of the electronic device;

determining whether the first application is identical to one of M applications to obtain a first determination result where M is a positive integer, wherein each of the M applications has at least one corresponding interface currently displayed on the display of the electronic device; and generating and outputting a prompt message if the first determination result indicates that the first application is not identical to any one of the M applications.

Optionally, the computer program instructions corresponding to the step of determining whether the first application is identical to one of the M applications to obtain the first determination result, when executed, include:

acquiring a first process corresponding to the first application;

acquiring M second processes respectively corresponding to the M applications; and determining whether the first process is identical to one of the M second processes to obtain the first determination result.

Optionally, the computer program instructions corresponding to steps after the step of determining whether the first application is identical to one of the M applications to obtain the first determination result, when executed, include:

displaying the first interface corresponding to the first application on the display of the electronic device in response to the first operation if the first determination result indicates that the first application is identical to one of the M applications.

Optionally, the computer program instructions corresponding to the step of generating and output the prompt message, when executed, include:

generating a prompt message indicating that the first interface corresponding to the first application is about to be displayed on the display of the electronic device; and displaying the prompt message in a first area of the display of the electronic device.

Optionally, the computer program instructions corresponding to steps after the step of displaying the prompt message in the first area of the display of the electronic device, when executed, include:

detecting a second input operation based on the prompt message;

displaying the first interface corresponding to the first application on the display of the electronic device if the second input operation indicates that it is permitted to respond to the first operation; or prohibiting displaying the first interface corresponding to the first application on the display of the electronic device if the second input operation indicates that it is prohibited to respond to the first operation.

Optionally, the computer program instructions corresponding to steps after the step of displaying the prompt message in the first area of the display of the electronic device, when executed, include:

determining whether the second input operation is detected in a predetermined time period starting from displaying the prompt message in the first area to obtain a second determination result; and displaying the first interface corresponding to the first application on the display of the electronic device in response to the first operation if the second determination result indicates that the second input operation is not detected in the predetermined time period.

An information processing method, provided in one embodiment of the disclosure applied to a electronic device including a display of the electronic device, where the method includes:

determining at least one application interface displayed on a current display of the electronic device;

determining an application corresponding to the application interface;

acquiring at least one application parameter corresponding to the application;

generating and outputting a first notice corresponding to the application based on the at least one application parameter.

According to technical solutions of the embodiments of the disclosure, the following technical means is employed: at least one application interface displayed on a current display of the electronic device is determined; an application corresponding to the application interface is determined; at least one application parameter corresponding to the application is acquired; a first notice corresponding to the application is generated and output based on the at least one application parameter. Therefore, the electronic device is able to display the information about an application corresponding to a currently used interface by the user. In the case where a malicious interface appears, the user is able to timely tell the truth from the false based on the notice displayed on the current interface, guaranteeing the information security. Therefore, the technical problem of being unable to guarantee the information security in the electronic device of conventional technologies is effectively solved, and the technical effect of the user being prompted in time to guarantee the information security is achieved.

Figure 9:
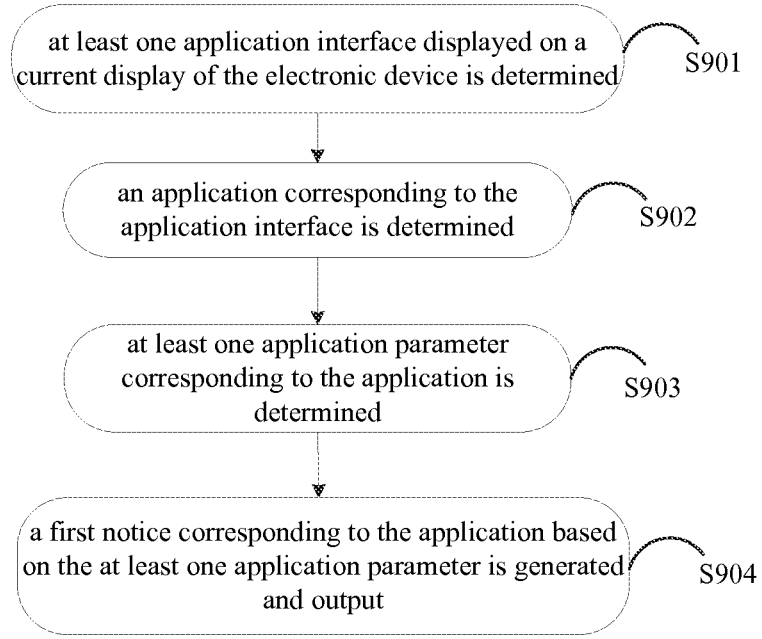
FIG. 9 is a flowchart of an information processing method according to an embodiment of the disclosure.

FIG. 9 is an information processing method according to an embodiment of the disclosure applied to an electronic device including a display of the electronic device. The method may include S910 to S904.

In S901, at least one application interface displayed on a current display of the electronic device is determined.

In S902, an application corresponding to the application interface is determined.

In S903, at least one application parameter corresponding to the application is determined.

In S904, a first notice corresponding to the application based on the at least one application parameter is generated and output.

In practice, the electronic device may be a smartphone, a notebook computer, a tablet computer or another electronic device with a display. Examples thereof will not be given one by one herein. In the embodiment of the disclosure, the implementation of the method according to the embodiment of the disclosure will be described in detail by taking a smartphone being the electronic device as an example.

When an information processing is performed according to the technical solution of this application, a step S901 is firstly performed, that is, at least one application interface displayed on a current display of the electronic device is determined.

Figure 10:
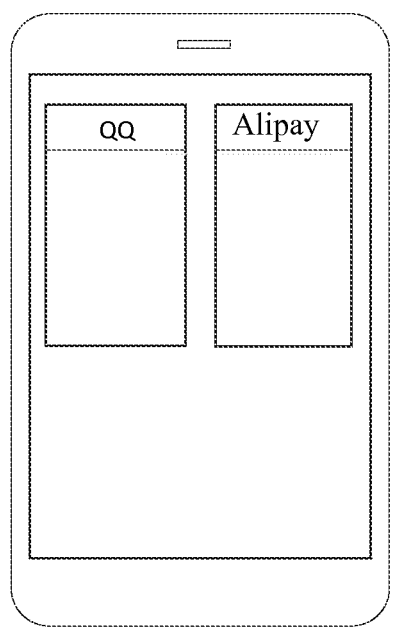
FIG. 10 is a schematic diagram of an implementation of a step S901 of the information processing method according to an embodiment of the disclosure.

According to the embodiment of the disclosure in which a smartphone is taken as the electronic device, the implementation of the step S901 is as follow. When an user uses multiple applications of the smartphone, a display of the smartphone would display multiple application interfaces corresponding to the applications. For example, when the user simultaneously start three applications of QQ, Alipay and WeChat, application interfaces, such as a QQ login interface, an Alipay login interface and an interface of "moments", which correspond to the three applications, are popped out from the background of the smartphone. At this point, the smart phone needs to determine one of the application interfaces which is displayed at the top-most layer. In the case where the application interfaces popped out in a manner of occupying the whole display of the smartphone, an application interface on which the user is able to operate is the application interface on the top-most layer. In the case where the application interfaces popped out in a manner of a small window, i.e., multiple application interfaces may be displayed on the display, the application interfaces are able to be fully displayed, that is, each of the application interfaces is not covered by other application interfaces. For example, the display interface of the smartphone completely displays the QQ login interface and the Alipay login interface as shown in FIG. 10 and in this case each of the two application interfaces is on the top-most layer. Of course, the way by which an application interface displayed at the top-most layer is determined depending on varies electronic devices and is not limited thereto. According to an embodiment of the disclosure, the implementation of the method according to the embodiment of the disclosure will be described in detail by an example of displaying the application interfaces of the smart phone in the manner of small windows. In this case, each of the QQ login interface and the Alipay login interface within the display interface of the smartphone is an application interface on the top-most layer, i.e., there are two application interfaces on the top-most layer.

After the step S901 is performed, the step S902 of the method according to the embodiment of the disclosure, that is, applications corresponding to the application interfaces are respectively determined.

Figure 11:
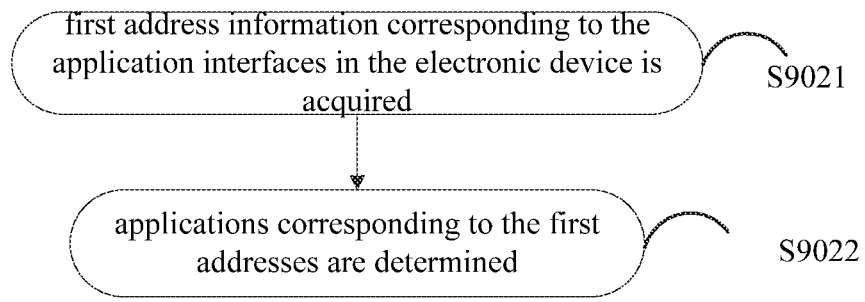
FIG. 11 is a flowchart of an implementation of a step S902 of the information processing method according to an embodiment of the disclosure.

Reference will be made to FIG. 11, and the implementation of the step S902 may include S9021 to S9022.

In S9021, first address information corresponding to the application interfaces in the electronic device is acquired.

In S9022, applications corresponding to the first addresses are determined.

Continually taking the electronic device being a smartphone as an example, in the case where the smartphone determines the QQ login interface and the Alipay login interface, the smartphone acquires storage addresses of the QQ login interface and the Alipay login interface within the smartphone respectively. By an example in which the smartphone firstly acquires a storage address, e.g., a folder Tencent of a secure digital memory card, of a call program within the smartphone when the QQ login interface is displayed. At this point, an application Tencent QQ corresponding to the folder Tencent is determined to be the application corresponding to the QQ login interface. The smartphone likewise determines the application corresponding to the Alipay login interface as the Alipay. In practice, the way by which an application corresponding to an application interface is acquired varies depending on systems of the electronic device, and is not limited thereto.

After the step S902 is performed, the step S903 is performed, that is, at least one application parameter corresponding to the application is acquired.

In practice, the step S903 includes:

acquiring an application name and an application package name of the application, where the application package name is an identifier of the application stored in the electronic device.

Continually taking the electronic device being a smartphone as an example, in the case where the smartphone determines that the application corresponding to the QQ login interface is the Tencent QQ and the application corresponding to the Alipay login interface is the Alipay, the smartphone respectively acquires the application name and package name of the Tencent QQ, and the application name and package name of the Alipay. For example, the name of an installation software of the Tencent QQ is determined to be "QQ" from a file in which the call program is located when the QQ login interface is displayed, that is, the application name of the Tencent QQ is acquired to be "QQ". Then, the address at which the installation software of the Tencent QQ is installed is acquired to be the package name, i.e., "com.tencent.mobileqq:MSF" of the Tencent QQ from the folder "Tencent". After the application name and package name of the Tencent QQ are acquired, the smartphone likewise respectively determines the application name and the package name of the Alipay to be "Alipay Wallet" and "com.eg.android.AlipayGphone".

After the step S903 is performed, the step S904 of the method according to the embodiment of the disclosure, that is, a first notice corresponding to the application is generated and output based on the at least one application parameter.

In practice, the step S904 may be performed in three manners.

Figure 12:
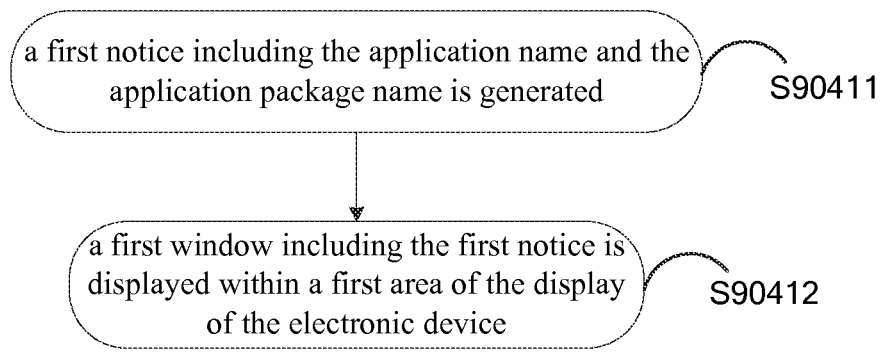
FIG. 12 is a flowchart of a first implementation of a step S904 of the information processing method according to an embodiment of the disclosure.
Figure 13:
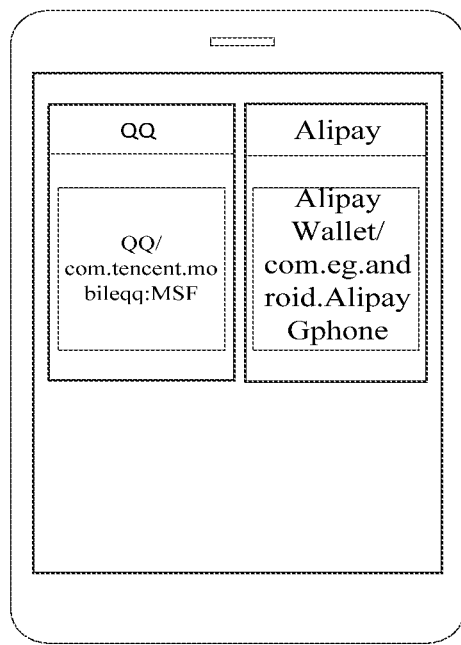
FIG. 13 is a schematic diagram of the first implementation of the step S904 of the information processing method according to an embodiment of the disclosure.

Reference is made to FIG. 12 for a first manner as follows:

in S90411, a first notice including the application name and the application package name is generated; and in S90412, a first window including the first notice is displayed within a first area of the display of the electronic device.

Continually taking the electronic device being a smartphone as an example, in the case where smartphone determines the application name and package name of the Tencent QQ respectively to be "QQ" and "com.tencent.mobileqq:MSF", and determines the application name and package name of the Alipay respectively to be "Alipay Wallet" and "com.eg.android.AlipayGphone", the first notice of the Tencent QQ is generated to be "QQ/com.tencent.mobileqq:MSF" and is displayed within an area corresponding to the QQ login interface via a notice window; and the first notice of the Alipay is generated to be "Alipay Wallet/com.eg.android.AlipayGphone", and is displayed within an area corresponding to the Alipay application interface via a notice window.

Figure 14:
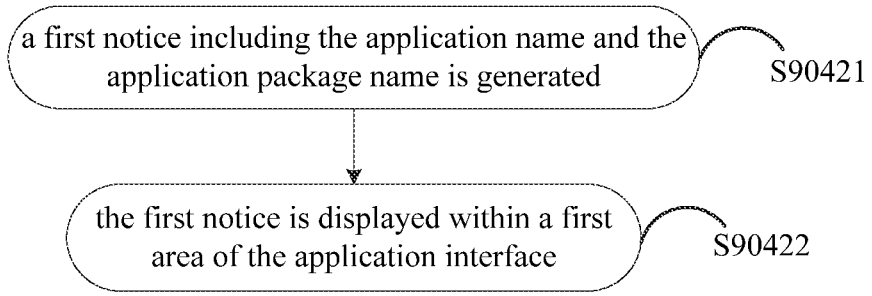
FIG. 14 is a flowchart of a second implementation of the step S904 of the information processing method according to an embodiment of the disclosure.

Reference is made to FIG. 14 for a second manner as follows:

in S90421, a first notice including the application name and the application package name is generated; and in S90422: the first notice is displayed within a first area of the application interface.

Figure 15:
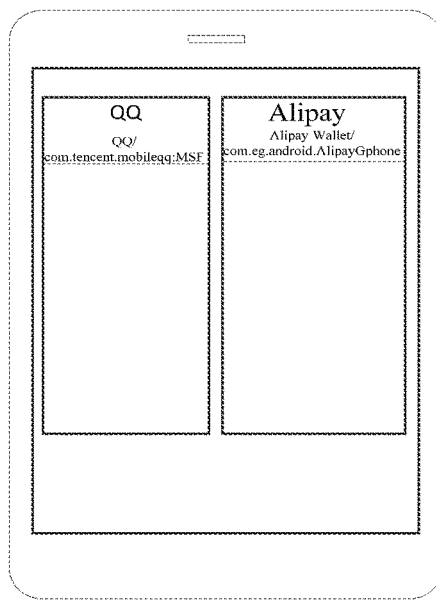
FIG. 15 is a first schematic diagram of the second implementation of the step S904 of the information processing method according to an embodiment of the disclosure.
Figure 16:
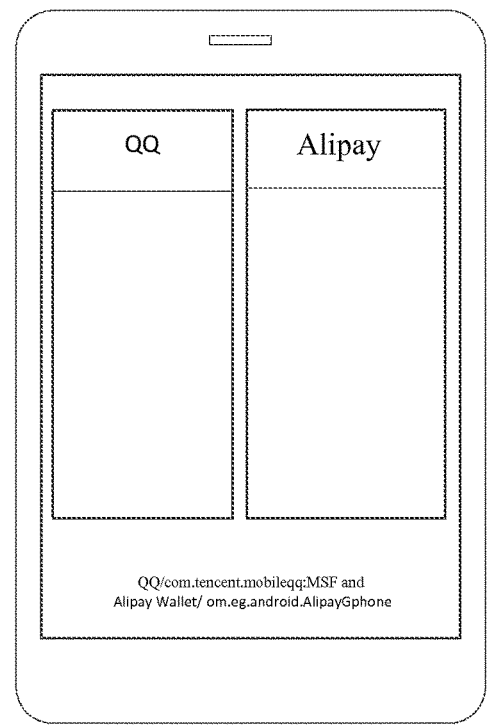
FIG. 16 is a second schematic diagram of the second implementation of the step S904 of the information processing method according to an embodiment of the disclosure.

Continually taking the electronic device being a smartphone as an example, in the case where the smartphone acquires the application name and the package name of the Tencent QQ respectively to be "QQ" and "com.tencent.mobileqq:MSF", and acquires the application name and the package name of the Alipay respectively to be "Alipay Wallet" and "com.eg.android.AlipayGphone", the notices of the Tencent QQ and Alipay are generated respectively to be "QQ/com.tencent.mobileqq:MSF" and "Alipay Wallet/com.eg.android.AlipayGphone". At this point, the notices are displayed in a manner of being embodied within the first areas of the application interfaces. For example, the "QQ/com.tencent.mobileqq:MSF" is embodied and displayed within a title bar of the QQ login interface, and the "Alipay Wallet/com.eg.android.AlipayGphone" is embodied and displayed within a title bar of the Alipay application interface, as shown in FIG. 15. Alternatively, the "QQ/com.tencent.mobileqq:MSF" and "Alipay Wallet/com.eg.android.AlipayGphone" may be integrated into one notice "QQ/com.tencent.mobileqq:MSF and Alipay Wallet/com.eg.android.AlipayGphone" which is displayed within a first area of the display of the smartphone, as shown in FIG. 16.

Figure 17:
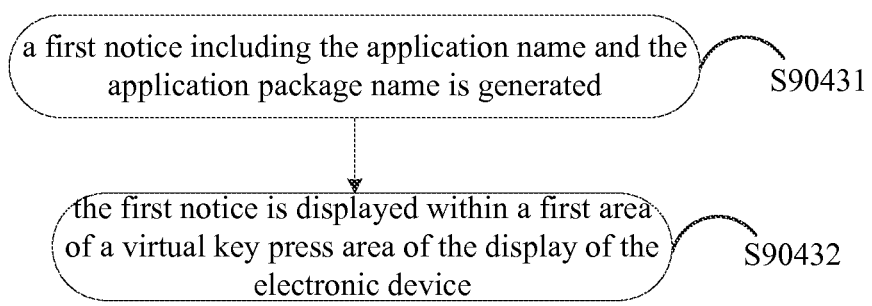
FIG. 17 is a flowchart of a third implementation of the step S904 of the information processing method of an embodiment of the disclosure.

Reference is made to FIG. 17 for a third manner as follows:

in S90431: a first notice including the application name and the application package name is generated; and in S90432: the first notice is displayed within a first area of a virtual key press area of the display of the electronic device.

Figure 18:
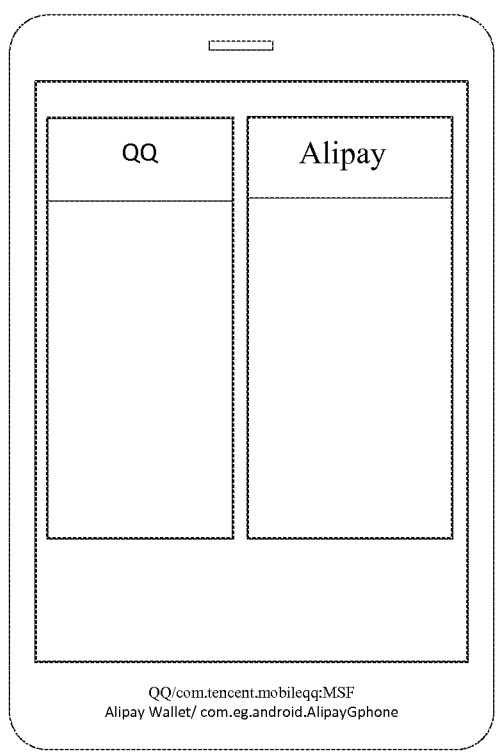
FIG. 18 is a schematic diagram of the third implementation of the step S904 of the information processing method of an embodiment of the disclosure.

Continually taking the electronic device being a smartphone as an example, in the case where the smartphone acquires the application name and the package name of the Tencent QQ respectively to be "QQ" and "com.tencent.mobileqq:MSF", and acquires the application name and the package name of the Alipay respectively to be "Alipay Wallet" and "com.eg.android.AlipayGphone", the notices of the Tencent QQ and the Alipay are respectively generated to be "QQ/com.tencent.mobileqq:MSF" and "Alipay Wallet/com.eg.android.AlipayGphone", and the two notices respectively corresponding to the Tencent QQ and the Alipay are displayed within the virtual key press area of the smartphone, as shown in FIG. 18.

In order to avoid the influence of the displaying of the notices on the usage by an user, the method according to the embodiment of the disclosure may further include:

acquiring a first display duration of the first notice; and controlling the first notice to be in a non-display state in the case where the first display duration is equal to or greater than a preset threshold.

Continually taking the electronic device being a smartphone as an example, in the case where the notice "QQ/com.tencent.mobileqq:MSF" corresponding to the Tencent QQ and the notice "Alipay Wallet/com.eg.android.AlipayGphone" corresponding to the Alipay Wallet are displayed on a display of the smartphone, the smartphone may further detect the display duration of the notices. The user may set a duration threshold such as 3 seconds during which the notices are displayed as required. After the display duration of the notices reaches 3 seconds, the notices automatically disappear. In practice, the skilled in the art may set the duration threshold as required, and the embodiment of the disclosure is not limited thereto.

Figure 19:
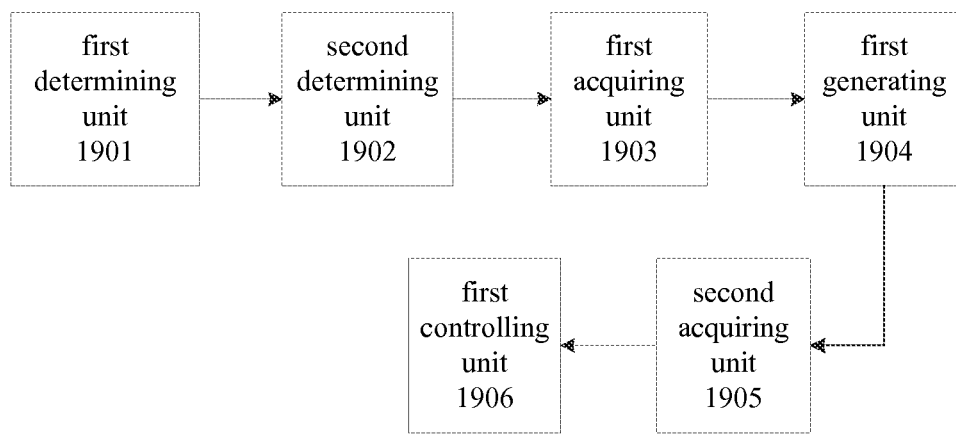
FIG. 19 is a structural block diagram of an electronic device according to an embodiment of the disclosure.

As shown in FIG. 19, based on the same inventive idea, the embodiment of the disclosure provides an electronic device including a display, and the electronic device further includes:

a first determining unit 1901 configured to determine at least one application interface displayed on a current interface of the display of the electronic device;

a second determining unit 1902 configured to determine an application corresponding to the application interface;

a first acquiring unit 1903 configured to acquire at least one application parameter corresponding to the application; and a first generating unit 1904 configured to generate and output a first notice corresponding to the application based on the at least one application parameter.

According to the embodiment of the disclosure, the second determining unit 1902 includes:

a first acquiring module configured to acquire a first address corresponding to the application interface in the electronic device; and a first determining module configured to determine an application corresponding to the first address to be the application corresponding to the application interface.

According to the embodiment of the disclosure, the first acquiring unit 1903 includes:

a first acquiring module configured to acquire an application name and an application package name of the application, wherein the application package name is an identifier of the application stored in the electronic device.

According to the embodiment of the disclosure, the first generating unit 1904 may be implemented in the following three manners.

A First Manner:

the first generating unit 1904 includes:

a first generating module configured to generate a first notice including the application name and the application package name; and a first display module configured to display a first window including the first notice within a first area of the display of the electronic device.

A Second Manner:

the first generating unit 1904 includes:

a second generating module configured to generate a first notice including the application name and the application package name; and a second display module configured to display the first notice within the first area of the application interface.

A Third Manner:

the first generating unit 1904 includes:

a third generating module configured to generate a first notice including the application name and the application package name; and a third display module configured to display the first notice within a first area of a virtual key press area of the display of the electronic device.

The electronic device according to the embodiment of the disclosure may further include:

a second acquiring unit 1905 configured to acquire a first display duration of the first notice; and a first controlling unit 1906 configured to control the first notice to be in a non-display state in the case where the first display duration is equal to or greater than a preset threshold.

According to technical solutions of the embodiments of the disclosure, the following technical means is employed: at least one application interface displayed on a current display of the electronic device is determined; an application corresponding to the application interface is determined; at least one application parameter corresponding to the application is acquired; a first notice corresponding to the application is generated and output based on the at least one application parameter. Therefore, the electronic device is able to display the information about an application corresponding to a currently used interface by the user. In the case where a malicious interface appears, the user is able to timely tell the truth from the false based on the notice displayed on the current interface, guaranteeing the information security. Therefore, the technical problem of being unable to guarantee the information security in the electronic device of conventional technologies is effectively solved, and the technical effect of the user being prompted in time to guarantee the information security is achieved.

According to the technical solution of the embodiments of the disclosure, the following technical means is employed: a first display duration of the first notice is acquired; and the first notice is controlled to be in a non-display state in the case where the first display duration is equal to or greater than a preset threshold. Accordingly, after the notice is displayed for a certain duration, the notice automatically disappears and the usage by the user will not be affected, the technical effect of guaranteeing the information security of the user without affecting the usage by the user is achieved.

According to the technical solution of the embodiments of the disclosure, the following technical means is employed: at least one application interface displayed on a current interface of the display of the electronic device is determined; an application corresponding to the application interface is determined; at least one application parameter corresponding to the application is acquired; and a first notice corresponding to the application is generated and output based on the at least one application parameter. Thus, the user can learn in real time whether the application corresponding to the current interface is safe during the usage by the user, the privacy leak due to the usage of an unsafe application is avoided. Therefore, the technical problem of user experience being low in an electronic device of the conventional technologies is effectively solved, guaranteeing the safe usage by the user and improving the user experience.

It should be understood by those skilled in the art that the embodiments of the disclosure may be provided as method, system or computer program product. Therefore, the embodiments of the disclosure may be complete hardware-based, complete software-based or software-hardware combined. Furthermore, the embodiments of the disclosure may be in the form of computer program product implemented on one or more computer-available storage medium (including but not limited to disc storage, CD-ROM, optical storage) having computer available program codes.

The disclosure is described in conjunction with flowcharts and/or block diagrams of the method, device (system) and computer program product according to the embodiments of the disclosure. It is to be understood that each or any combination of flows and/or blocks in the flowcharts and/or block diagrams may be implemented with computer program instructions. The computer program instructions may be supplied to a processor of general-purpose computer, dedicated computer, embedded processor or other programmable data processing devices to generate a machine, so that apparatus(es) for implementing function(s) specified in one or more flows in the flowcharts and/or one or more blocks in the block diagrams may be generated with the instructions executed by the processor of computer or other programmable data processing devices.

The computer program instructions may also be stored in a computer readable storage which can instruct the computer or other programmable data processing devices to function in specific ways so that a product including an instruction apparatus is generated with the instructions stored in the computer readable storage. The function(s) specified in one or more flows in the flowcharts and/or one or more blocks in the block diagrams is implemented with the instruction apparatus.

The computer program instructions may also loaded to the computer or other programmable data processing devices, so that a series of operation steps are performed on the computer or other programmable devices to generate computer-implemented processes. Step(s) for implementing the function(s) specified in one or more flows in the flowcharts and/or one or more blocks in the block diagrams is provided with the instructions executed on the computer or other programmable devices.

Specifically, the computer program instructions corresponding to the information processing method in the embodiment of the disclosure may be stored in store mediums such as optic disk, hard disk or U disk. The computer program instructions corresponding to the information processing method and stored in the storage medium, when executed, include the following steps of:

determining at least one application interface displayed a current display of the electronic device;

determining an application corresponding to the application interface;

acquiring at least one application parameter corresponding to the application;

generating and outputting a first notice corresponding to the application based on the at least one application parameter.

Optionally, the computer program instructions corresponding to the step of determining an application corresponding to the application interface and stored in the storage medium, when executed, include:

acquiring a first address corresponding to the application interface in the electronic device;

determining an application corresponding to the first address to be the application corresponding to the application interface.

Optionally, the computer program instructions corresponding to the step of acquiring at least one application parameter corresponding to the application and stored in the storage medium, when executed, include:

acquiring an application name and an application package name of the application, where the application package name is an identifier of the application stored in the electronic device.

Optionally, the computer program instructions corresponding to the step of generating and outputting a first notice corresponding to the application based on the at least one application parameter and stored in the storage medium, when executed, include:

generating the first notice including the application name and the application package name; and displaying a first window including the first notice within a first area of the display of the electronic device.

Optionally, the computer program instructions corresponding to the step of generating and outputting a first notice corresponding to the application based on the at least one application parameter and stored in the storage medium, when executed, include:

generating the first notice including the application name and the application package name; and displaying the first notice within a first area of the application interface.

Optionally, the computer program instructions corresponding to the step of generating and outputting a first notice corresponding to the application based on the at least one application parameter stored in the storage medium, when executed, include:

generating the first notice including the application name and the application package name of the application; and displaying the first notice within a first area of a virtual key press area of the display of the electronic device.

Optionally, the computer program instructions corresponding to a step after the step of generating and outputting a first notice corresponding to the application based on the at least one application parameter and stored in the storage medium, when executed, include:

acquiring a first display duration of the first notice; and controlling the first notice to be in a non-display state in the case where the first display duration is equal to or greater than a preset threshold.

An electronic device including a processor and a storage medium with operation instructions is provided in an embodiment of the disclosure. When the operation instructions are run, following steps are carried out by the processor:

detecting a first operation of a first application, wherein the first operation is for displaying a first interface corresponding to the first application on a display of the electronic device;

determining whether the first application is identical to one of M applications to obtain a first determination result where M is a positive integer, wherein each of the M applications has at least one corresponding interface currently displayed on the display of the electronic device; and generating and outputting a prompt message if the first determination result indicates that the first application is not identical to any one of the M applications.

In one embodiment of the disclosure, the processor of the electronic device carrying out the step of determining whether the first application is identical to one of the M applications to obtain the first determination result comprises:

acquiring a first process corresponding to the first application;

acquiring M second processes respectively corresponding to the M applications; and determining whether the first process is identical to one of the M second processes to obtain the first determination result.

In one embodiment of the disclosure, the processor of the electronic device further carrying out the following steps:

displaying the first interface corresponding to the first application on the display of the electronic device in response to the first operation if the first determination result indicates that the first application is identical to one of the M applications.

In one embodiment of the disclosure, the processor of the electronic device carrying out the step of generating and output the prompt message comprises:

generating a prompt message indicating that the first interface corresponding to the first application is about to be displayed on the display of the electronic device; and displaying the prompt message in a first area of the display of the electronic device.

In one embodiment of the disclosure, the processor of the electronic device further carrying out the following steps:

detecting a second input operation based on the prompt message;

displaying the first interface corresponding to the first application on the display of the electronic device if the second input operation indicates that it is permitted to respond to the first operation; or prohibiting displaying the first interface corresponding to the first application on the display of the electronic device if the second input operation indicates that it is prohibited to respond to the first operation.

In one embodiment of the disclosure, the processor of the electronic device further carrying out the following steps:

determining at least one application interface displayed on the display of the electronic device;

determining an application corresponding to the application interface;

acquiring at least one application parameter corresponding to the application; and generating and outputting a first notice corresponding to the application based on the at least one application parameter.

In one embodiment of the disclosure, the processor of the electronic device carrying out the step of determining an application corresponding to the application interface comprises:

acquiring a first address corresponding to the application interface in the electronic device; and determining an application corresponding to the first address to be the application corresponding to the application interface.

In one embodiment of the disclosure, the processor of the electronic device carrying out the step of acquiring at least one application parameter corresponding to the application comprises:

acquiring an application name and an application package name of the application, wherein the application package name is an identifier of the application stored in the electronic device.

In one embodiment of the disclosure, the processor of the electronic device carrying out the step of generating and outputting a first notice corresponding to the application based on the at least one application parameter comprises:

generating the first notice comprising the application name and the application package name; and displaying a first window comprising the first notice within a first area of the display of the electronic device.

In one embodiment of the disclosure, the processor of the electronic device carrying out the step of generating and outputting a first notice corresponding to the application based on the at least one application parameter comprises:

generating the first notice comprising the application name and the application package name; and displaying the first notice within a first area of the application interface.

Some embodiments of the disclosure have been described, while alterations and modifications may be made to the embodiments by those skilled in the art based on basic creative concepts of the disclosure. Therefore, appended claims are intended to include the embodiments and all the alterations and modifications falling within the scope of protection of the disclosure.

Apparently, various modifications and variations may be made by those skilled in the art without deviating from the spirit and scope of the disclosure. Therefore, if the modifications and variations fall within the scope of the claims and equivalent techniques of the disclosure, the disclosure is intended to include the modifications and variations.

The invention claimed is:

1. An information processing method, applied to an electronic device comprising a processor and a displayer, wherein M applications are operating on the electronic device where M is a positive integer, each of the M applications has at least one interface currently displayed on the displayer of the electronic device, and the method comprising:

detecting, by the processor, a first operation of a first application, wherein the first application is operating in a background of the electronic device, and the first operation is for displaying a first interface corresponding to the first application on the displayer of the electronic device;

determining whether the first application is identical to one of the M applications;

displaying, by the processor, the first interface corresponding to the first application on the displayer of the electronic device in response to the first operation after determining that the first application is identical to one of the M applications;

generating, by the processor, and outputting a prompt message indicating that the first interface corresponding to the first application is about to be displayed in response to determining that the first application is not identical to any one of the M applications; and based upon a user input operation received in response to the prompt message, prohibiting, by the processor, display of the first interface corresponding to the first application on the displayer of the electronic device when the user input operation indicates that it is prohibited to respond to the first operation.

2. The information processing method according to claim 1, wherein the generating and outputting, by the processor, the prompt message comprises:

generating, by the processor, a prompt message indicating that the first interface corresponding to the first application is about to be displayed on the displayer of the electronic device; and displaying, by the processor, the prompt message in a first area of the display of the electronic device.

3. The information processing method according to claim 2, after the displaying, by the processor, the prompt message in the first area of the displayer of the electronic device, further comprises:

detecting, by the processor, the user input operation based on the prompt message.

4. The information processing method according to claim 1, further comprising:

determining, by the processor, at least one application interface displayed on the displayer of the electronic device;

determining, by the processor, an application corresponding to each application interface;

acquiring, by the processor, at least one application parameter corresponding to each application; and generating and outputting, by the processor, a first notice corresponding to the application based on the at least one application parameter.

5. The method according to claim 4, wherein the determining, by the processor, an application corresponding to each application interface comprises:

acquiring, by the processor, a first address corresponding to the application interface in the electronic device; and determining, by the processor, an application corresponding to the first address to be the application corresponding to the application interface.

6. The method according to claim 5, wherein the acquiring, by the processor, at least one application parameter corresponding to each application comprises:

acquiring, by the processor, an application name and an application package name of the application, wherein the application package name is an identifier of the application stored in the electronic device.

7. The method according to claim 6, wherein the generating and outputting, by the processor, a first notice corresponding to the application based on the at least one application parameter comprises:
  generating, by the processor, the first notice comprising the application name and the application package name; and
  displaying, by the processor, a first window comprising the first notice within a first area of the displayer of the electronic device.

8. The method according to claim 6, wherein the generating and outputting, by the processor, a first notice corresponding to the application based on the at least one application parameter comprises:
  generating, by the processor, the first notice comprising the application name and the application package name; and
  displaying, by the processor, the first notice within a first area of the application interface.

9. The information processing method according to claim 1, wherein the determining, by the processor, whether the first application is identical to one of the M applications comprises:
  acquiring, by the processor, a first process corresponding to the first application;
  acquiring, by the processor, M second processes respectively corresponding to the M applications; and
  determining, by the processor, whether the first process is identical to one of the M second processes to obtain a first determination result.

10. An electronic device comprising:
  a displayer
  a storage medium including operation instructions; and
  a processor communicatively coupled to the storage medium, wherein, M applications are operating on the electronic device, where M is a positive integer, each of the M applications has at least one interface currently displayed on the displayer of the electronic device, and when the processor executes the operation instructions, the operation instructions cause the processor to:
  detect a first operation of a first application, wherein the first application is operating in a background of the electronic device, and the first operation is for displaying a first interface corresponding to the first application on the displayer of the electronic device;
  determine whether the first application is identical to one of the M applications;
  display the first interface corresponding to the first application on the displayer of the electronic device in response to the first operation after determining that the first application is identical to one of the M applications;
  generate and output a prompt message after determining that the first application is not identical to any one of the M applications; and
  based upon a user input operation received in response to the prompt message, prohibit display of the first interface corresponding to the first application on the displayer of the electronic device when the user input operation indicates that it is prohibited to respond to the first operation.

11. The electronic device according to claim 10, wherein the generate and output the prompt message further comprises:
  generate a prompt message indicating that the first interface corresponding to the first application is about to be displayed on the displayer of the electronic device; and
  display the prompt message in a first area of the displayer of the electronic device.

12. The electronic device according to claim 11, wherein, when the processor executes the operation instructions, the processor is further configured to:
  detect the user input operation based on the prompt message.

13. The electronic device according to claim 10, wherein, when the processor executes the operation instructions, the processor is further configured to:
  determine at least one application interface displayed on the displayer of the electronic device;
  determine an application corresponding to each application interface;
  acquire at least one application parameter corresponding to each application; and
  generate and output a first notice corresponding to the application based on the at least one application parameter.

14. The electronic device according to claim 13, wherein the determine an application corresponding to each application interface further comprises:
  acquire a first address corresponding to the application interface in the electronic device; and
  determine an application corresponding to the first address to be the application corresponding to the application interface.

15. The electronic device according to claim 14, wherein the acquire at least one application parameter corresponding to each application comprises:
  acquire an application name and an application package name of the application, wherein the application package name is an identifier of the application stored in the electronic device.

16. The electronic device according to claim 15, wherein the generate and output a first notice corresponding to the application based on the at least one application parameter further comprises:
  generate the first notice comprising the application name and the application package name; and
  display a first window comprising the first notice within a first area of the displayer of the electronic device.

17. The electronic device according to claim 15, wherein the generate and output a first notice corresponding to the application based on the at least one application parameter further comprises:
  generate the first notice comprising the application name and the application package name; and
  display the first notice within a first area of the application interface.

18. The electronic device according to claim 10, wherein, when the processor determines whether the first application is identical to one of the M applications, the processor is further configured to:
  acquire, by the processor, a first process corresponding to the first application;
  acquire, by the processor, M second processes respectively corresponding to the M applications; and
  determine, by the processor, whether the first process is identical to one of the M second processes to obtain a first determination result.

* * * * *